US012738829B2

(12) United States Patent
Han

(10) Patent No.: US 12,738,829 B2
(45) Date of Patent: Sep. 15, 2026

(54) ELECTRONIC DEVICE FOR GENERATING INTERNAL VOLTAGE

(71) Applicant: SK hynix Inc., Icheon-si (KR)

(72) Inventor: Ji Hee Han, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 652 days.

(21) Appl. No.: 18/354,879

(22) Filed: Jul. 19, 2023

(65) Prior Publication Data

US 2024/0364200 A1 Oct. 31, 2024

(30) Foreign Application Priority Data

Apr. 21, 2023 (KR) ........................ 10-2023-0052998

(51) Int. Cl.
*H02M 1/00* (2007.01)
*H02M 3/156* (2006.01)

(52) U.S. Cl.
CPC ......... *H02M 1/0003* (2021.05); *H02M 3/156* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;

(Continued)

(56) References Cited

U.S. PATENT DOCUMENTS 9,086,713 B2 * 7/2015 Choi .......................... G05F 1/56
9,323,260 B2 * 4/2016 Kim ........................ G05F 1/465

(Continued)

FOREIGN PATENT DOCUMENTS

KR 100920841 B1 10/2009

*Primary Examiner* — Jeffrey A Gblende

(74) *Attorney, Agent, or Firm* — WILLIAM PARK AND ASSOCIATES LTD.

(57) ABSTRACT

An electronic device includes a synthetic voltage generation circuit configured to generate a synthetic voltage by synthesizing a supply voltage a voltage level of which is changed in response to a change in a voltage level of a first external voltage and an upper limit reference voltage a voltage level of which is set in response to a first selection signal and a second selection signal that are generated by detecting a process, voltage, and temperature (PVT) variation, and an internal voltage generation circuit configured to, based on the synthetic voltage, generate an internal voltage that is used as a body voltage of a transistor included in an internal circuit.

29 Claims, 17 Drawing Sheets

(58) Field of Classification Search
CPC ... H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 9,964,974 | B2 * | 5/2018 | Lee | G05F 1/468 |
| 2017/0257066 | A1 | 9/2017 | Saputra et al. | |

* cited by examiner

ELECTRONIC DEVICE FOR GENERATING INTERNAL VOLTAGE

CROSS-REFERENCE TO RELATED APPLICATION

The present application claims priority under 35 U.S.C. § 119(a) to Korean Patent Application No. 10-2023-0052998, filed in the Korean Intellectual Property Office on Apr. 21, 2023, the entire disclosure of which is incorporated herein by reference.

BACKGROUND

The present disclosure relates to an electronic device for generating an internal voltage having a target voltage level even when there is a change in the voltage level of an external voltage and a process, voltage, and temperature (PVT) variation.

In general, a semiconductor memory device generates an internal voltage that is necessary for its internal operation by receiving a power source voltage VDD and a ground voltage VSS from an external device and uses the generated internal voltage. The internal voltage that is necessary for the semiconductor memory device includes a core voltage VCORE that is supplied to a memory core area, a high voltage VPP that is used to drive a word line or perform over-driving, and a back-bias voltage VBB that is supplied as a bulk voltage of a transistor of the core area.

There is a need for a method of solving a change in the voltage level of the internal voltage because the voltage level of the internal voltage is changed in response to a change in the voltage level of the power source voltage VDD that is supplied from the external device during an operation that generates the internal voltage and a process, voltage, and temperature (PVT) variation. Furthermore, there is a need for a method of solving the occurrence of a phenomenon in which transistors included in the semiconductor memory device are latched up because the transistors are latched up when the voltage level of the internal voltage is changed in response to a change in the voltage level of the power source voltage VDD and a PVT variation.

SUMMARY

In an embodiment, an electronic device may include a synthetic voltage generation circuit configured to generate a synthetic voltage by synthesizing a supply voltage, a voltage level of which is changed in response to a change in a voltage level of a first external voltage, and an upper limit reference voltage a voltage level of which is set in response to a first selection signal and a second selection signal that are generated by detecting a process, voltage, and temperature (PVT) variation, and an internal voltage generation circuit configured to, based on the synthetic voltage, generate an internal voltage that is used as a body voltage of a transistor included in an internal circuit.

In another embodiment, an electronic device may include a skew detection circuit configured to generate a first selection signal and a second selection signal by detecting a process, voltage, and temperature (PVT) variation, a synthetic voltage generation circuit configured to generate a synthetic voltage by synthesizing a ground voltage and an upper limit reference voltage, a voltage level of which is set in response to the first selection signal and the second selection signal, and an internal voltage generation circuit configured to, based on the synthetic voltage, generate an internal voltage that is used as a body voltage of a transistor included in an internal circuit.

In still another embodiment, an electronic device may include a skew detection circuit configured to generate a plurality of process codes by detecting a process, voltage, and temperature (PVT) variation, a synthetic voltage generation circuit configured to generate a plurality of voltage codes by detecting a change in a voltage level of a first external voltage and configured to generate a synthetic voltage, a voltage level of which is set based on the plurality of voltage codes and the plurality of process codes, and an internal voltage generation circuit configured to, based on the synthetic voltage, generate an internal voltage that is used as a body voltage of a transistor included in an internal circuit.

DETAILED DESCRIPTION

Figure 1:
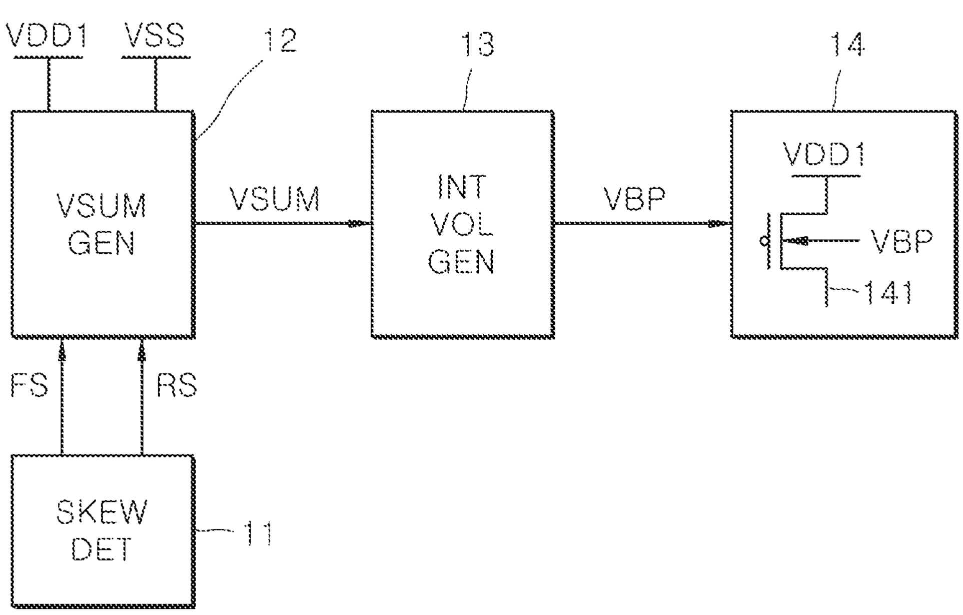
FIG. 1 is a block diagram illustrating a construction of an electronic device according to an embodiment of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to exemplify the present disclosure, and the scope of the present disclosure is not limited by the embodiments.

The present disclosure may provide an electronic device for generating an internal voltage having a constant voltage level by using a synthetic voltage that is generated by synthesizing a supply voltage the voltage level of which is changed in response to a change in the voltage level of an external voltage and an upper limit reference voltage having a constant voltage level regardless of a change in the voltage level of the external voltage.

The present disclosure has an effect in that it can generate an internal voltage having a constant voltage level based on a synthetic voltage that is generated by synthesizing a supply voltage the voltage level of which is changed in response to a change in the voltage level of an external voltage and an upper limit reference voltage having a constant voltage level regardless of a change in the voltage level of the external voltage.

Furthermore, the present disclosure has an effect in that, by generating a synthetic voltage by compensating for a change in the voltage level of an external voltage and a PVT variation and using the synthetic voltage as the input of a comparator for generating the internal voltage, it can prevent a phenomenon in which a transistor using an internal voltage is latched up.

Furthermore, by generating a synthetic voltage by compensating for a change in the voltage level of an external voltage and a PVT variation and using the synthetic voltage as the input of a comparator for generating the internal voltage, the present disclosure has an effect in that it can generate an internal voltage the voltage level of which is matched with a target voltage level.

As illustrated in FIG. 1, an electronic device 1 according to an embodiment of the present disclosure may include a skew detection circuit (SKEW DET) 11, a synthetic voltage generation circuit (VSUM GEN) 12, an internal voltage generation circuit (INT VOL GEN) 13, and an internal circuit 14.

The skew detection circuit 11 may generate a first selection signal FS and a second selection signal RS by detecting a skew according to a process, voltage, and temperature (PVT) variation. The skew detection circuit 11 may generate the first selection signal FS that is enabled when the operating speed of the electronic device becomes slow in response to the PVT variation. The skew detection circuit 11 may generate the second selection signal RS that is enabled when the operating speed of the electronic device becomes fast in response to the PVT variation. The PVT variation may mean a change in the process, voltage, and temperature within the electronic device 1. For example, the skew detection circuit 11 may generate the first selection signal FS and the second selection signal RS by detecting a process variation, but this is merely an embodiment and the present disclosure is not limited to the embodiment. The skew detection circuit 11 may generate the first selection signal FS and the second selection signal RS by detecting at least one of a process variation, a voltage variation, and a temperature variation. A case in which the operating speed of the electronic device becomes slow in response to a PVT variation may mean that a timing at which a pulse included in a period signal OSC is generated becomes slow. A case in which the operating speed of the electronic device becomes slow in response to a PVT variation may mean a case in which the first selection signal FS is enabled. A case in which the operating speed of the electronic device becomes fast in response to a PVT variation may mean that a timing at which a pulse included in the period signal OSC is generated becomes fast. A case in which the operating speed of the electronic device becomes fast in response to a PVT variation may mean a case in which the second selection signal RS is enabled.

The synthetic voltage generation circuit 12 may generate a synthetic voltage VSUM from a first external voltage VDD1 and a ground voltage VSS by compensating for a change in the voltage level of the first external voltage VDD1 and a PVT variation. The synthetic voltage generation circuit 12 may generate the synthetic voltage VSUM based on the first external voltage VDD1, the ground voltage VSS, the first selection signal FS, and the second selection signal RS. The synthetic voltage generation circuit 12 may generate the synthetic voltage VSUM by synthesizing a supply voltage (VDP in FIG. 6), the voltage level of which is changed in response to a change in the voltage level of the first external voltage VDD1, and an upper limit reference voltage (VRU in FIG. 6) having a constant voltage level regardless of a change in the voltage level of the first external voltage VDD1. The first external voltage VDD1 may be set as a voltage that is supplied from outside of the electronic device 1.

The internal voltage generation circuit 13 may generate an internal voltage VBP based on the synthetic voltage VSUM. Based on the synthetic voltage VSUM, the internal voltage generation circuit 13 may generate the internal voltage VBP that is used as a body voltage of a PMOS transistor 141 included in the internal circuit 14, the body voltage being a voltage applied to the body of the PMOS transistor 141. The internal voltage VBP may be generated to have a positive voltage level as a body voltage of a common PMOS transistor.

The internal circuit 14 may be implemented as a common circuit including multiple transistors. The internal circuit 14 may include the PMOS transistor 141. The PMOS transistor 141 may be used in the internal circuit 14 that performs various operations by receiving the internal voltage VBP as its body voltage. The PMOS transistor 141 may perform an operation that supplies charges by receiving the first external voltage VDD1. The first external voltage VDD1 that is supplied to the internal circuit 14 may be set as various voltages, such as a core voltage VCORE that is used in the electronic device 1.

The electronic device 1 may generate the internal voltage VBP having a constant voltage level based on the synthetic voltage VSUM that is generated by synthesizing the supply voltage (VDP in FIG. 6), the voltage level of which is changed in response to a change in the voltage level of the first external voltage VDD1, and the upper limit reference voltage (VRU in FIG. 6) having a constant voltage level regardless of a change in the voltage level of the first external voltage VDD1. By generating the synthetic voltage VSUM by compensating for a change in the voltage level of the first external voltage VDD1 and a PVT variation and using the synthetic voltage VSUM as the input of a comparator (131 in FIG. 10) for generating the internal voltage VBP, the electronic device 1 can prevent a phenomenon in which a transistor using the internal voltage VBP is latched up. By generating the synthetic voltage VSUM by compensating for a change in the voltage level of the first external voltage VDD1 and a PVT variation and using the synthetic voltage VSUM as the input of the comparator (131 in FIG. 10) that generates the internal voltage VBP, the electronic device 1 can generate the internal voltage VBP, the voltage level of which is matched with a target voltage level.

Figure 2:
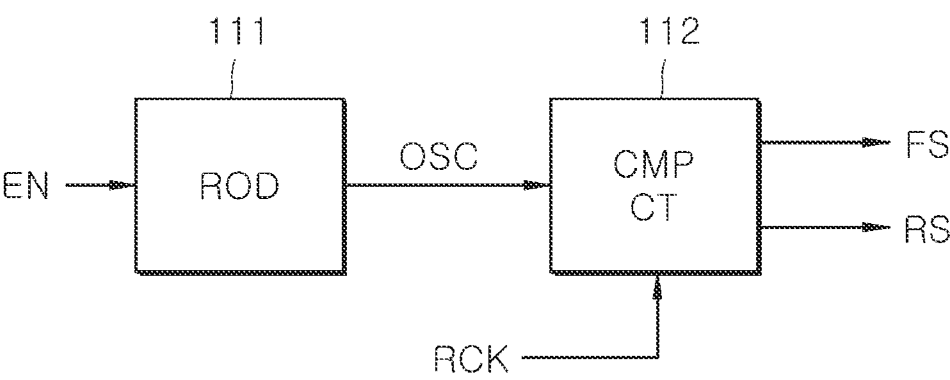
FIG. 2 is a block diagram illustrating a construction according to an embodiment of a skew detection circuit that is included in the electronic device illustrated in FIG. 1.

FIG. 2 is a block diagram illustrating a construction according to an embodiment of the skew detection circuit 11 that is included in the electronic device 1. The skew detection circuit 11 may include an oscillator (ROD) 111 and a comparison circuit (CMP CT) 112.

The oscillator 111 may generate the period signal OSC that is periodically toggled in response to an enable signal EN. The oscillator 111 may generate the period signal OSC including a pulse that is periodically generated in response to the enable signal EN. The oscillator 111 may generate the period signal OSC that is periodically toggled during an interval in which the enable signal EN is enabled in order to detect a PVT variation. The oscillator 111 may generate the period signal OSC having varying timings at which a pulse of the period signal OSC is generated in response to a PVT variation. The enable signal EN may be set as a signal that is enabled to a logic high level to perform an operation that detects a PVT variation.

The comparison circuit 112 may generate the first selection signal FS and the second selection signal RS by comparing the phase of the period signal OSC and the phase of a reference clock RCK. The comparison circuit 112 may generate the first selection signal FS that is enabled when the phase of the period signal OSC is later than the phase of the reference clock RCK. The comparison circuit 112 may generate the second selection signal RS that is enabled when the phase of the period signal OSC is earlier than the phase of the reference clock RCK. The reference clock RCK may be set as a signal including a pulse having a logic high level, which is generated at constant periods regardless of a PVT variation. Although the comparison circuit 112 has been implemented to generate the first selection signal FS and the second selection signal RS, the comparison circuit 112 may be implemented to generate multiple signals by detecting a PVT variation according to an embodiment.

Figure 3:
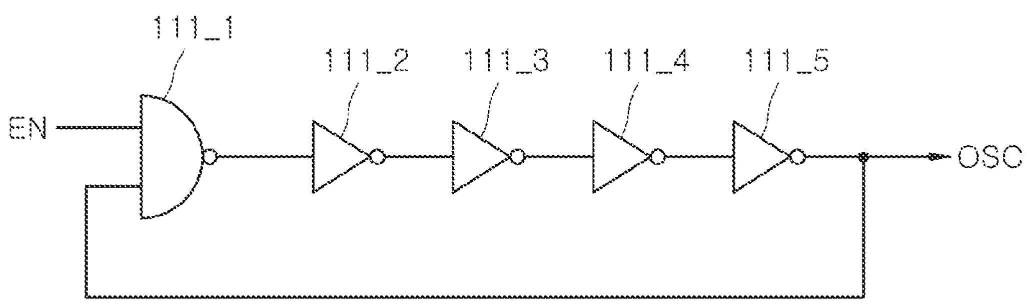
FIG. 3 is a circuit diagram illustrating a construction according to an embodiment of an oscillator that is included in the skew detection circuit illustrated in FIG. 2.

FIG. 3 is a circuit diagram illustrating a construction according to an embodiment of the oscillator 111 that is included in the skew detection circuit 11.

The oscillator 111 may be implemented with a NAND gate 111_1 and inverters 111_2, 111_3, 111_4, and 111_5. The NAND gate 111_1 and the inverters 111_2, 111_3, 111_4, and 111_5 may be connected in series. The NAND gate 111_1 may generate an output signal having a logic high level when the enable signal EN is disabled to a logic low level. The NAND gate 111_1 may operate as an inverter when the enable signal EN is enabled to a logic high level and may invert and output the output signal of the inverter 111_5. The inverters 111_2, 111_3, 111_4, and 111_5 may invert and output their input signals, respectively.

The oscillator 111 may generate the period signal OSC that is fixed to a logic high level when the enable signal EN is disabled to a logic low level. The oscillator 111 may generate the period signal OSC including a pulse that is periodically generated during an interval in which the enable signal EN is enabled to a logic high level.

Figure 4:
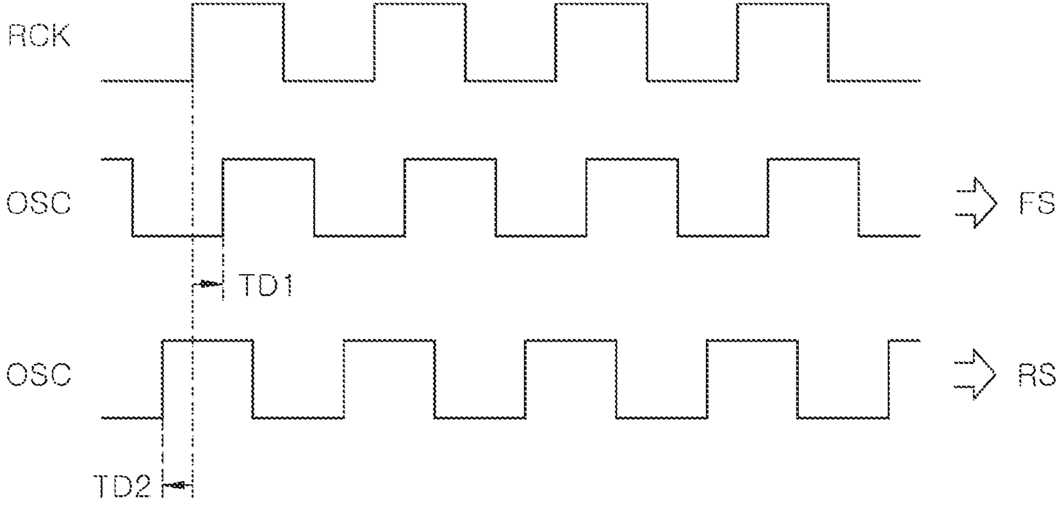
FIG. 4 is a timing diagram for describing an operation of the skew detection circuit illustrated in FIG. 2.

FIG. 4 is a timing diagram for describing an operation of the skew detection circuit 11 illustrated in FIG. 2.

First, an operation of the skew detection circuit 11, when the operating speed of the electronic device becomes slow in response to a PVT variation, is described as follows.

When the operating speed of the electronic device becomes slow in response to the PVT variation, the oscillator 111 may generate the period signal OSC, the pulse of which has a generation timing that is later than a pulse of the reference clock RCK by a time TD1.

The comparison circuit 112 may generate the first selection signal FS that is enabled when the phase of the period signal OSC is later than the phase of the reference clock RCK.

The skew detection circuit 11 may generate the first selection signal FS that is enabled when the operating speed of the electronic device becomes slow in response to a PVT variation.

An operation of the skew detection circuit 11, when the operating speed of the electronic device becomes fast in response to a PVT variation, is described as follows.

When the operating speed of the electronic device becomes fast in response to the PVT variation, the oscillator 111 may generate the period signal OSC, the pulse of which has a generation timing that is earlier than the pulse of the reference clock RCK by a TD2 time.

The comparison circuit 112 may generate the second selection signal RS that is enabled when the phase of the period signal OSC is earlier than the phase of the reference clock RCK.

The skew detection circuit 11 may generate the second selection signal RS that is enabled when the operating speed of the electronic device becomes fast in response to a PVT variation.

Figure 5:
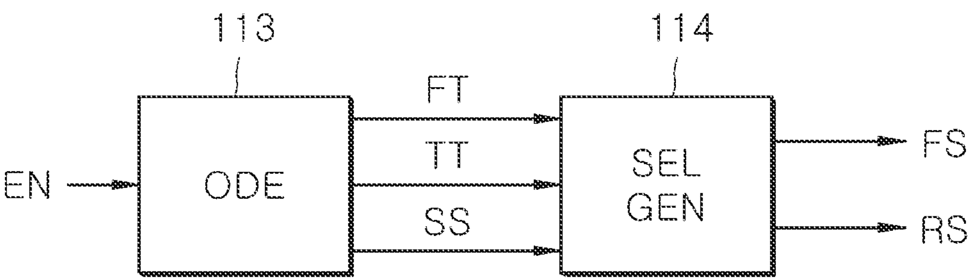
FIG. 5 is a block diagram illustrating a construction according to another embodiment of the skew detection circuit that is included in the electronic device illustrated in FIG. 1.

FIG. 5 is a block diagram illustrating a construction according to another embodiment of the skew detection circuit 11 that is included in the electronic device 1. A skew detection circuit 11*a* may include a monitoring circuit (ODE) 113 and a selection signal generation circuit (SEL GEN) 114.

During an interval in which the enable signal EN is enabled, the monitoring circuit 113 may generate first process information FF, second process information TT, and third process information SS including feature information (characteristic information) regarding the transistor 141 that is included in the internal circuit 14. Furthermore, during the interval in which the enable signal EN is enabled, the monitoring circuit 113 may generate the first process information FF that is enabled when the operating speed of the transistor 141 that is included in the internal circuit 14 is fast. Additionally, during the interval in which the enable signal EN is enabled, the monitoring circuit 113 may generate the second process information TT that is enabled when the operating speed of the transistor 141 that is included in the internal circuit 14 is an average speed. Finally, during the interval in which the enable signal EN is enabled, the monitoring circuit 113 may generate the third process information SS that is enabled when the operating speed of the transistor 141 that is included in the internal circuit 14 is slow.

The selection signal generation circuit 114 may generate the first selection signal FS and the second selection signal RS based on the first process information FF, the second process information TT, and the third process information SS. When the first process information FF is enabled, the selection signal generation circuit 114 may generate the first selection signal FS that is disabled and the second selection signal RS that is enabled. When the second process information TT is enabled, the selection signal generation circuit 114 may maintain the first selection signal FS and the second selection signal RS that were previously generated. When the third process information SS is enabled, the selection signal generation circuit 114 may generate the first selection signal FS that is enabled and the second selection signal RS that is disabled.

When the operating speed of the transistor 141 that is included in the internal circuit 14 is slow, the skew detection circuit 11*a* may generate the first selection signal FS that is enabled and the second selection signal RS that is disabled. When the operating speed of the transistor 141 that is included in the internal circuit 14 is an average speed, the skew detection circuit 11*a* may maintain the first selection signal FS and the second selection signal RS that were previously generated. When the operating speed of the transistor 141 that is included in the internal circuit 14 is fast, the skew detection circuit 11*a* may generate the first selection signal FS that is disabled and the second selection signal RS that is enabled.

Figure 6:
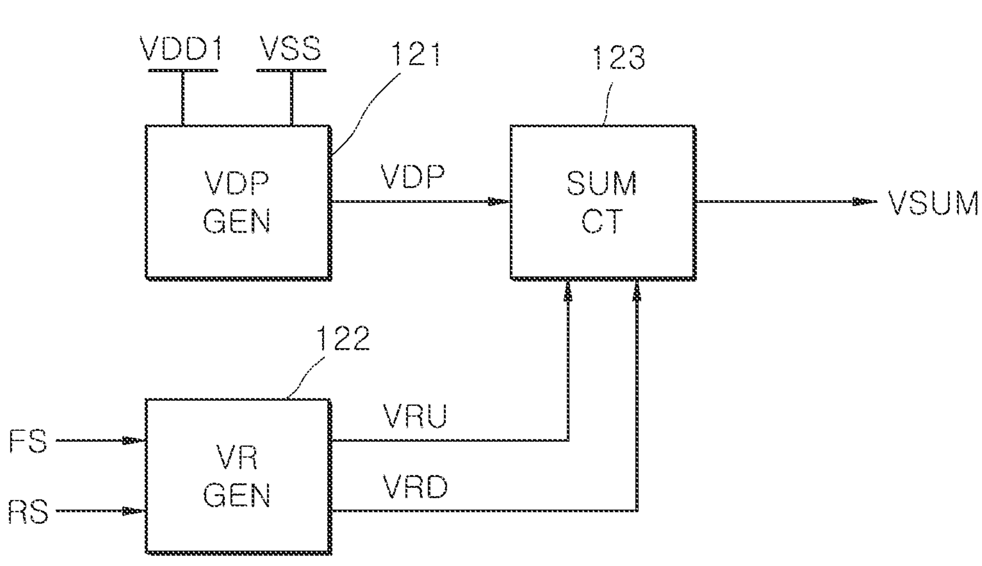
FIG. 6 is a block diagram illustrating a construction according to an embodiment of a synthetic voltage generation circuit that is included in the electronic device illustrated in FIG. 1.

FIG. 6 is a block diagram illustrating a construction according to an embodiment of the synthetic voltage generation circuit 12 that is included in the electronic device 1. The synthetic voltage generation circuit 12 may include a supply voltage generation circuit (VDP GEN) 121, a reference voltage generation circuit (VR GEN) 122, and a synthetic circuit (SUM CT) 123.

The supply voltage generation circuit 121 may generate the supply voltage VDP based on the first external voltage VDD1 and the ground voltage VSS. The supply voltage generation circuit 121 may generate the supply voltage VDP, the voltage level of which is changed, in response to a change in the voltage level of the first external voltage VDD1. The supply voltage generation circuit 121 may generate the supply voltage VDP, the voltage level of which rises, when the voltage level of the first external voltage VDD1 rises. The supply voltage generation circuit 121 may generate the supply voltage VDP, the voltage level of which drops, when the voltage level of the first external voltage VDD1 drops.

The reference voltage generation circuit 122 may generate the upper limit reference voltage VRU and a lower limit reference voltage VRD, the voltage levels of which are set, in response to the first selection signal FS and the second selection signal RS. When the first selection signal FS is enabled, the reference voltage generation circuit 122 may generate the upper limit reference voltage VRU having a first voltage level and the lower limit reference voltage VRD having the voltage level of the ground voltage VSS. When the second selection signal RS is enabled, the reference voltage generation circuit 122 may generate the upper limit reference voltage VRU having a second voltage level and the lower limit reference voltage VRD having the voltage level of the ground voltage VSS. The first voltage level may be set at a higher voltage level than the second voltage level. The first voltage level and the second voltage level may be set at various voltage levels according to an embodiment.

The synthetic circuit 123 may generate the synthetic voltage VSUM based on the supply voltage VDP, the upper limit reference voltage VRU, and the lower limit reference voltage VRD. The synthetic circuit 123 may generate the synthetic voltage VSUM by comparing a first comparison voltage (VCP1 in FIG. 9) that is generated by synthesizing the supply voltage VDP and the upper limit reference voltage VRU with a second comparison voltage (VCP2 in FIG. 9) that is generated by synthesizing the synthetic voltage VSUM and the lower limit reference voltage VRD.

Figure 7:
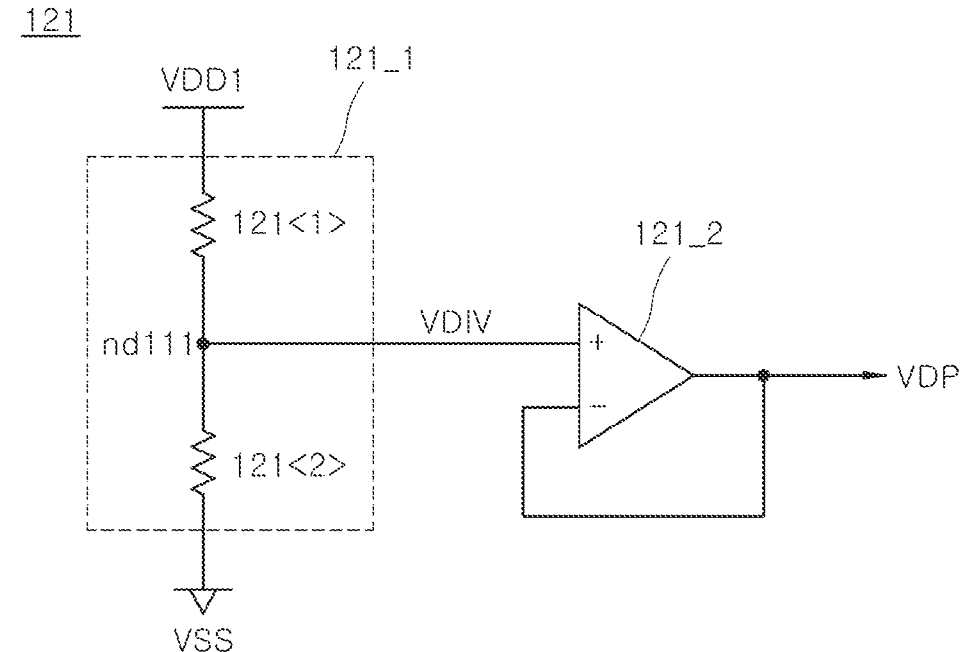
FIG. 7 is a diagram illustrating a construction according to an embodiment of a supply voltage generation circuit that is included in the synthetic voltage generation circuit illustrated in FIG. 6.

FIG. 7 is a diagram illustrating a construction according to an embodiment of the supply voltage generation circuit 121 that is included in the synthetic voltage generation circuit 12. The supply voltage generation circuit 121 may include a first voltage division circuit 121_1 and a first comparator 121_2.

The first voltage division circuit 121_1 may be implemented with a resistor 121<1> that is disposed between the first external voltage VDD1 and a node nd111 and a resistor 121<2> that is disposed between the node nd111 and the ground voltage VSS. The first voltage division circuit 121_1 may generate a division voltage VDIV by dividing the first external voltage VDD1 by the resistors 121<1> and 121<2> that are disposed between the first external voltage VDD1 and the ground voltage VSS. The first voltage division circuit 121_1 may generate the division voltage VDIV having a voltage level that is half the voltage level of the first external voltage VDD1. The first voltage division circuit 121_1 may generate the division voltage VDIV, the voltage level of which rises, when the voltage level of the first external voltage VDD1 rises. The first voltage division circuit 121_1 may generate the division voltage VDIV, the voltage level which drops, when the voltage level of the first external voltage VDD1 drops. The resistors 121<1> and 121<2> may be set to have the same resistance value.

The first comparator 121_2 may generate the supply voltage VDP by comparing the division voltage VDIV with the supply voltage VDP. The first comparator 121_2 may set the voltage level of the supply voltage VDP by comparing the division voltage VDIV with the supply voltage VDP. The first comparator 121_2 may raise the voltage level of the supply voltage VDP when the voltage level of the supply voltage VDP is lower than the voltage level of the division voltage VDIV.

Figure 8:
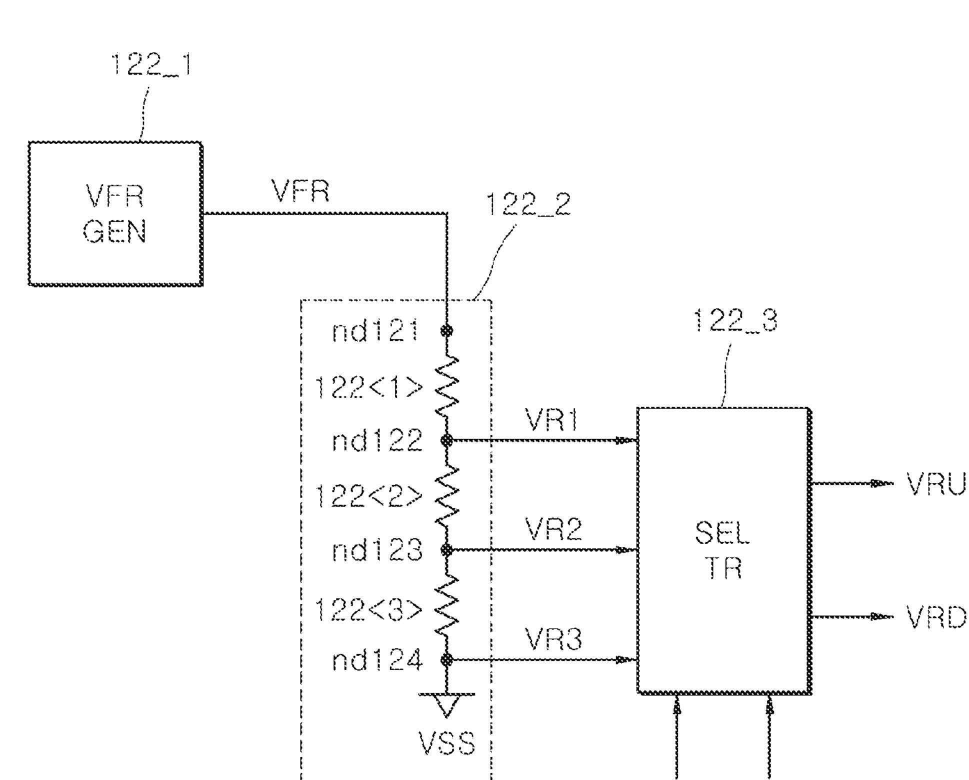
FIG. 8 is a diagram illustrating a construction according to an embodiment of a reference voltage generation circuit that is included in the synthetic voltage generation circuit illustrated in FIG. 6.

FIG. 8 is a diagram illustrating a construction according to an embodiment of the reference voltage generation circuit 122 that is included in the synthetic voltage generation circuit 12. The reference voltage generation circuit 122 may include a fixed constant voltage generation circuit (VFR GEN) 1221, a second voltage division circuit 1222, and a selection transfer circuit (SEL TR) 122_3.

The fixed constant voltage generation circuit 122_1 may generate the fixed voltage VFR having a constant voltage level regardless of the voltage level of the first external voltage VDD1. The fixed constant voltage generation circuit 122_1 may be implemented as a common Widlar circuit and may generate the fixed voltage VFR having a constant voltage level. The voltage level of the fixed voltage VFR may be variously set according to an embodiment.

The second voltage division circuit 122_2 may be implemented with a resistor 122<1> that is disposed between a node nd121 to which the fixed voltage VFR is supplied and a node nd122, a resistor 122<2> that is disposed between the node nd122 and a node nd123, and a resistor 122<3> that is disposed between the node nd123 and a node nd124 to which the ground voltage VSS is supplied.

The second voltage division circuit 122_2 may generate a first internal reference voltage VR1, a second internal reference voltage VR2, and a third internal reference voltage VR3 having sequentially lower voltage levels by dividing the fixed voltage VFR by the resistors 122<1>, 122<2>, and 122<3> that are disposed between the fixed voltage VFR and the ground voltage VSS. The second voltage division circuit 122_2 may generate the first internal reference voltage VR1 having a first voltage level (e.g., 100 mV) by dividing the fixed voltage VFR. The second voltage division circuit 122_2 may generate the second internal reference voltage VR2 having a second voltage level (e.g., 50 mV) by dividing the fixed voltage VFR. The second voltage division circuit 1222 may generate the third internal reference voltage VR3 having the voltage level (0 V) of the ground voltage VSS. The voltage levels of the first internal reference voltage VR1, the second internal reference voltage VR2, and the third internal reference voltage VR3 that are generated by the second voltage division circuit 122_2 may be variously set according to an embodiment.

The selection transfer circuit 122_3 may generate the upper limit reference voltage VRU and the lower limit reference voltage VRD from the first internal reference voltage VR1, the second internal reference voltage VR2, and the third internal reference voltage VR3 in response to the first selection signal FS and the second selection signal RS.

When the first selection signal FS is enabled, the selection transfer circuit 122_3 may output the first internal reference voltage VR1 as the upper limit reference voltage VRU and may generate the upper limit reference voltage VRU from the first internal reference voltage VR1 having the first voltage level (e.g., 100 mV). Furthermore, when the first selection signal FS is enabled, the selection transfer circuit 122_3 may output the third internal reference voltage VR3 as the lower limit reference voltage VRD and may generate the lower limit reference voltage VRD having the voltage level (0 V) of the ground voltage VSS.

When the second selection signal RS is enabled, the selection transfer circuit 122_3 may output the second internal reference voltage VR2 as the upper limit reference voltage VRU and may generate the upper limit reference voltage VRU having the second voltage level (e.g., 50 mV). Furthermore, when the second selection signal RS is enabled, the selection transfer circuit 122_3 may output the third internal reference voltage VR3 as the lower limit reference voltage VRD and may generate the lower limit reference voltage VRD having the voltage level (0 V) of the ground voltage VSS.

Figure 9:
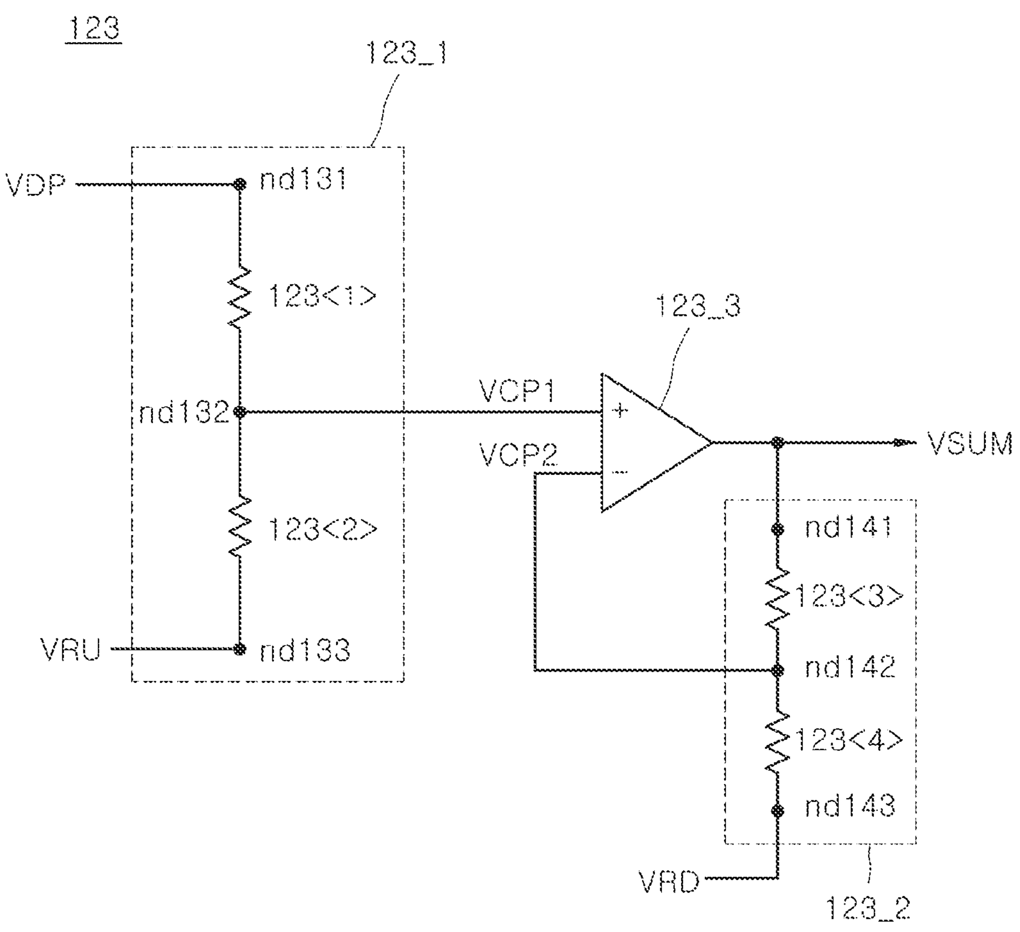
FIG. 9 is a diagram illustrating a construction according to an embodiment of a synthetic circuit that is included in the synthetic voltage generation circuit illustrated in FIG. 6.

FIG. 9 is a diagram illustrating a construction according to an embodiment of the synthetic circuit 123 that is included in the synthetic voltage generation circuit 12. The synthetic circuit 123 may include a third voltage division circuit 123_1, a fourth voltage division circuit 1232, and a second comparator 123_3.

The third voltage division circuit 123_1 may be implemented with a resistor 123<1> that is disposed between a node nd131 to which the supply voltage VDR is supplied and a node nd132 and a resistor 123<2> that is disposed between the node nd132 and a node nd133 to which the upper limit reference voltage VRU is supplied.

The third voltage division circuit 1231 may generate the first comparison voltage VCP1 having an intermediate voltage level between the voltage levels of the supply voltage VDR and the upper limit reference voltage VRU through the resistors 123<1> and 123<2> that are disposed between the supply voltage VDR and the upper limit reference voltage VRU. The resistors 123<1> and 123<2> may be set to have the same resistance value.

The fourth voltage division circuit 123_2 may be implemented with a resistor 123<3> that is disposed between a node nd141 to which the synthetic voltage VSUM is supplied and a node nd142 and a resistor 123<4> that is disposed between the node nd142 and a node nd143 to which the lower limit reference voltage VRD is supplied.

The fourth voltage division circuit 1232 may generate the second comparison voltage VCP2 having an intermediate voltage level between the voltage levels of the synthetic voltage VSUM and the lower limit reference voltage VRD through the resistors 123<3> and 123<4> that are disposed between the synthetic voltage VSUM and the lower limit reference voltage VRD. The resistors 123<3> and 123<3> may be set to have the same resistance value.

The second comparator 123_3 may generate the synthetic voltage VSUM by comparing the first comparison voltage VCP1 with the second comparison voltage VCP2. The second comparator 123_3 may set the voltage level of the synthetic voltage VSUM by comparing the first comparison voltage VCP1 with the second comparison voltage VCP2. The second comparator 123_3 may raise the voltage level of the synthetic voltage VSUM when the voltage level of the second comparison voltage VCP2 is lower than the voltage level of the first comparison voltage VCP1.

Figure 10:
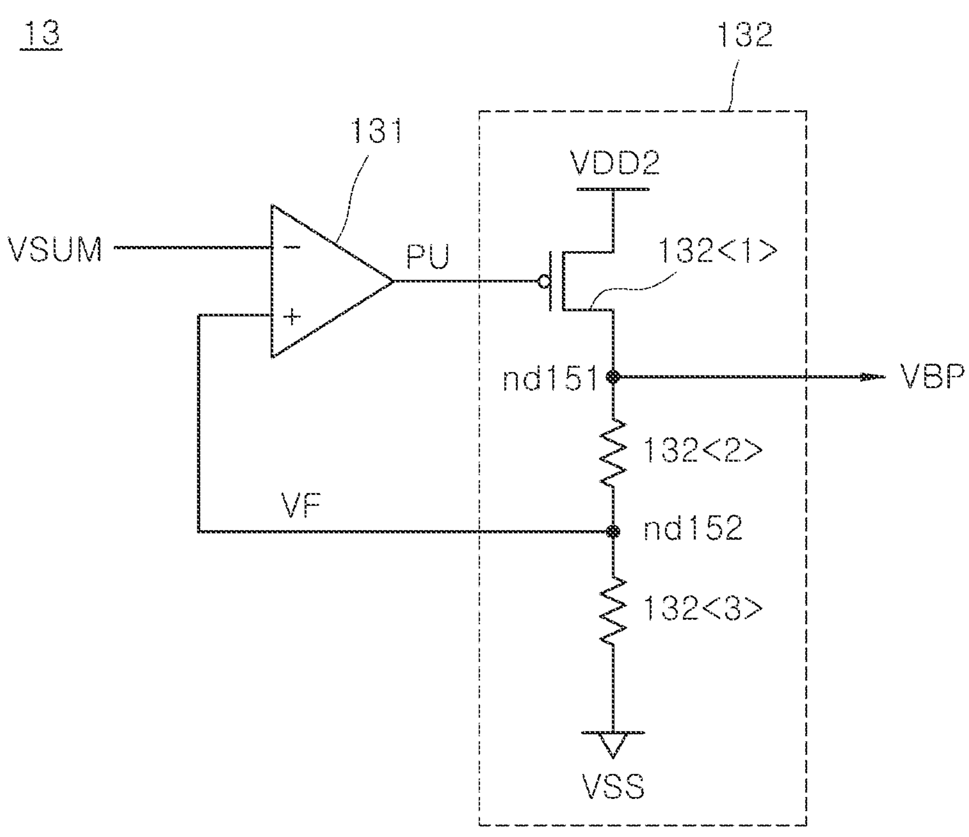
FIG. 10 is a diagram illustrating a construction according to an embodiment of an internal voltage generation circuit that is included in the electronic device illustrated in FIG. 1.

FIG. 10 is a diagram illustrating a construction according to an embodiment of the internal voltage generation circuit 13 that is included in the electronic device 1. The internal voltage generation circuit 13 may include the third comparator 131 and an internal voltage driving circuit 132.

The third comparator 131 may generate a pull-up signal PU by comparing the synthetic voltage VSUM with a feedback voltage VF that is generated by dividing the internal voltage VBP. The third comparator 131 may generate the pull-up signal PU that is enabled to a logic low level when the voltage level of the synthetic voltage VSUM is lower than the voltage level of the feedback voltage VF.

The internal voltage driving circuit 132 may be implemented with a PMOS transistor 132<1> that is disposed between a second external voltage VDD2 and a node nd151 and that is turned on by the pull-up signal PU, a resistor 132<2> that is disposed between the node nd151 and a node nd152, and a resistor 132<3> that is disposed between the node nd152 and the ground voltage VSS. The second external voltage VDD2 may be set as a voltage having a higher voltage level than the first external voltage VDD1. The second external voltage VDD2 may be set as various voltages, such as a high voltage VPP that is used in the electronic device 1.

The internal voltage driving circuit 132 may drive the internal voltage VBP to the voltage level of the second external voltage VDD2 when the pull-up signal PU is enabled to a logic low level. The internal voltage driving circuit 132 may generate the feedback voltage VF having a voltage level that is half the voltage level of the internal voltage VBP by dividing the internal voltage VBP by the resistors 132<1> and 132<2>. The resistors 132<2> and 132<3> may be set to have the same resistance value.

Such an electronic device 1 may generate the internal voltage VBP having a constant voltage level based on the synthetic voltage VSUM that is generated by synthesizing the supply voltage VDP, the voltage level of which is changed, in response to a change in the voltage level of the first external voltage VDD1, and the upper limit reference voltage VRU having a constant voltage level regardless of a change in the voltage level of the first external voltage VDD1. By generating the synthetic voltage VSUM by compensating for a change in the voltage level of the first external voltage VDD1 and a PVT variation and using the synthetic voltage VSUM as the input of the third comparator 131 for generating the internal voltage VBP, the electronic device 1 can prevent a phenomenon in which a transistor using the internal voltage VBP is latched up. By generating the synthetic voltage VSUM by compensating for a change in the voltage level of the first external voltage VDD1 and a PVT variation and using the synthetic voltage VSUM as the input of the third comparator 131 for generating the internal voltage VBP, the electronic device 1 can generate the internal voltage VBP the voltage level of which is matched with a target voltage level.

Figure 11:
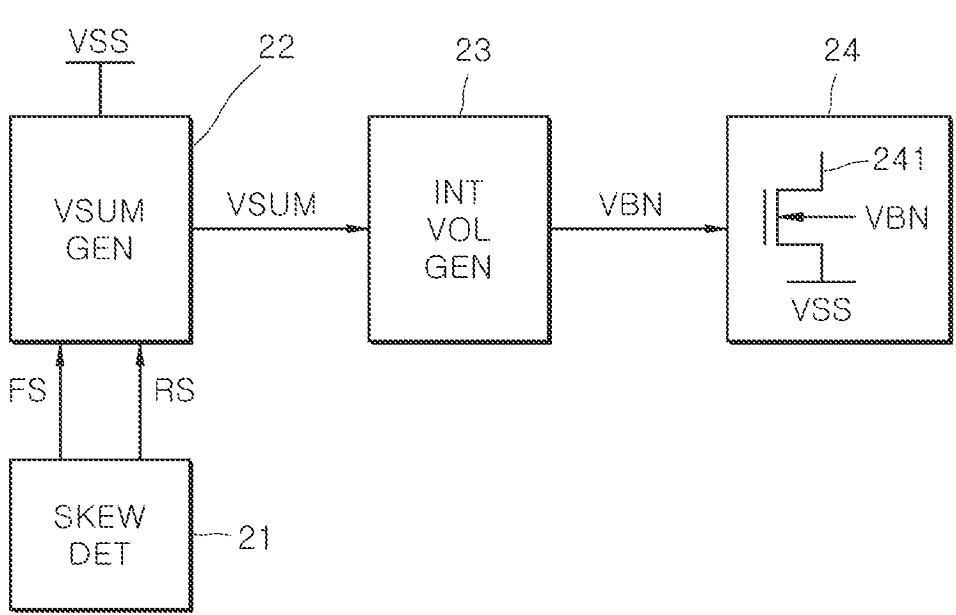
FIG. 11 is a block diagram illustrating a construction of an electronic device according to another embodiment of the present disclosure.

FIG. 11 is a block diagram illustrating a construction of an electronic device 2 according to another embodiment of the present disclosure. As illustrated in FIG. 11, the electronic device 2 according to another embodiment of the present disclosure may include a skew detection circuit (SKEW DET) 21, a synthetic voltage generation circuit (VSUM GEN) 22, an internal voltage generation circuit (INT VOL GEN) 23, and an internal circuit 24.

The skew detection circuit 21 may generate a first selection signal FS and a second selection signal RS by detecting a PVT variation. The skew detection circuit 21 may generate the first selection signal FS that is enabled when the operating speed of the electronic device becomes slow in response to a PVT variation. The skew detection circuit 21 may generate the second selection signal RS that is enabled when the operating speed of the electronic device becomes fast in response to a PVT variation. The skew detection circuit 21 may be implemented with the same circuits as the skew detection circuit 11 and 11*a*, illustrated in FIGS. 2 to 5, and may perform the same operation as the skew detection circuit 11 and 11*a*, and thus, detailed descriptions of the same circuits and operation have been omitted. The PVT variation may mean a process, voltage, and temperature variation within the electronic device 2. A case in which the operating speed of the electronic device becomes slow in response to a PVT variation may mean that a timing at which a pulse included in the period signal OSC is generated becomes slow. A case in which the operating speed of the electronic device becomes slow in response to a PVT variation may mean a case in which the third process information SS is enabled. A case in which the operating speed of the electronic device becomes fast in response to a PVT variation may mean that a timing at which a pulse included in the period signal OSC is generated becomes fast. A case in which the operating speed of the electronic device becomes fast in response to a PVT variation may mean a case in which the first process information FF is enabled.

The synthetic voltage generation circuit 22 may generate a synthetic voltage VSUM from a ground voltage VSS by compensating for a PVT variation. The synthetic voltage generation circuit 22 may generate the synthetic voltage VSUM based on a ground voltage VSS, the first selection signal FS, and the second selection signal RS. In response to the first selection signal FS and the second selection signal RS, the synthetic voltage generation circuit 22 may generate the synthetic voltage VSUM by synthesizing the ground voltage VSS and an upper limit reference voltage (VRU in FIG. 12) having a constant voltage level regardless of a change in the voltage level of the first external voltage VDD1.

The internal voltage generation circuit 23 may generate an internal voltage VBN based on the synthetic voltage VSUM. Based on the synthetic voltage VSUM, the internal voltage generation circuit 23 may generate the internal voltage VBN that is used as a body voltage of an NMOS transistor 241 that is included in the internal circuit 24. The internal voltage VBN may be generated to have a negative voltage level or the voltage level of the ground voltage VSS as a body voltage of a common NMOS transistor.

The internal circuit 24 may be implemented as a common circuit including multiple transistors. The internal circuit 214 may include the NMOS transistor 241. The NMOS transistor 241 may be used in the internal circuit 24 that performs various operations by receiving the internal voltage VBN as a body voltage. The NMOS transistor 241 may perform an operation that discharges internal charges of the internal circuit 24 as the ground voltage VSS.

The electronic device 2 may generate the internal voltage VBN having a constant voltage level based on the synthetic voltage VSUM that is generated by synthesizing the ground voltage VSS and the upper limit reference voltage (VRU in FIG. 12) having a constant voltage level regardless of a change in the voltage level of a first external voltage VDD1. By generating the synthetic voltage VSUM by compensating for a PVT variation and using the synthetic voltage VSUM as the inputs of comparators (231 and 232 in FIG. 14) for generating the internal voltage VBN, the electronic device 2 can prevent a phenomenon in which a transistor using the internal voltage VBN is latched up. By generating the synthetic voltage VSUM by compensating for a PVT variation and using the synthetic voltage VSUM as the inputs of the comparators (231 and 232 in FIG. 14) for generating the internal voltage VBN, the electronic device 2 can generate the internal voltage VBN the voltage level of which is matched with a target voltage level.

Figure 12:
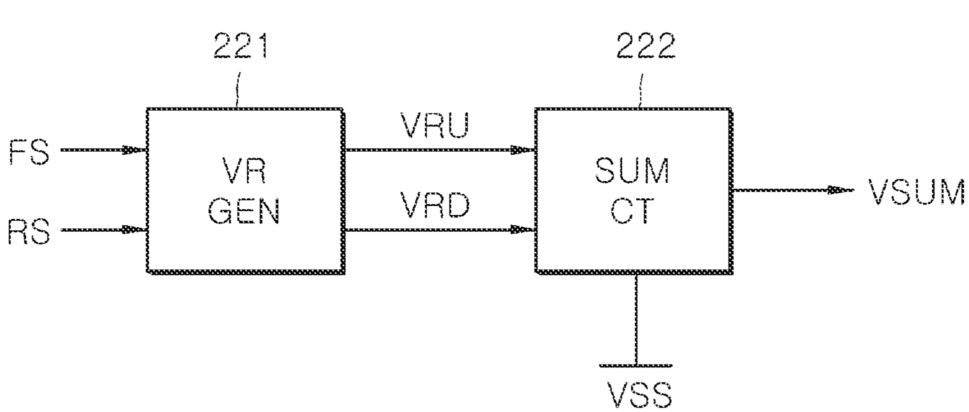
FIG. 12 is a block diagram illustrating a construction according to an embodiment of a synthetic voltage generation circuit that is included in the electronic device illustrated in FIG. 11.

FIG. 12 is a block diagram illustrating a construction according to an embodiment of the synthetic voltage generation circuit 22 that is included in the electronic device 2. The synthetic voltage generation circuit 22 may include a reference voltage generation circuit (VR GEN) 221 and a synthetic circuit 222 (SUM CT).

The reference voltage generation circuit 221 may generate the upper limit reference voltage VRU and a lower limit reference voltage VRD, the voltage levels of which are set in response to the first selection signal FS and the second selection signal RS. When the first selection signal FS is enabled, the reference voltage generation circuit 221 may generate the upper limit reference voltage VRU having a first voltage level and the lower limit reference voltage VRD having the voltage level of the ground voltage VSS. When the second selection signal RS is enabled, the reference voltage generation circuit 221 may generate the upper limit reference voltage VRU having a second voltage level and the lower limit reference voltage VRD having the voltage level of the ground voltage VSS. The upper limit reference voltage VRU that is generated to have the first voltage level by the reference voltage generation circuit 221 may be generated as −100 mV, that is, a negative voltage of the first voltage level, which has been described above. The upper limit reference voltage VRU that is generated to have the second voltage level by the reference voltage generation circuit 221 may be generated as −50 mV, that is, a negative voltage of the second voltage level, which has been described above. The first voltage level may be set at a lower voltage level than the second voltage level. The first voltage level and the second voltage level may be set at various voltage levels according to an embodiment.

The synthetic circuit 222 may generate the synthetic voltage VSUM based on the ground voltage VSS, the upper limit reference voltage VRU, and the lower limit reference voltage VRD. The synthetic circuit 222 may generate the synthetic voltage VSUM by comparing a first comparison voltage (VCP1 in FIG. 13) that is generated by synthesizing the ground voltage VSS with the upper limit reference voltage VRU and a second comparison voltage (VCP2 in FIG. 13) that is generated by synthesizing the synthetic voltage VSUM and the lower limit reference voltage VRD.

Figure 13:
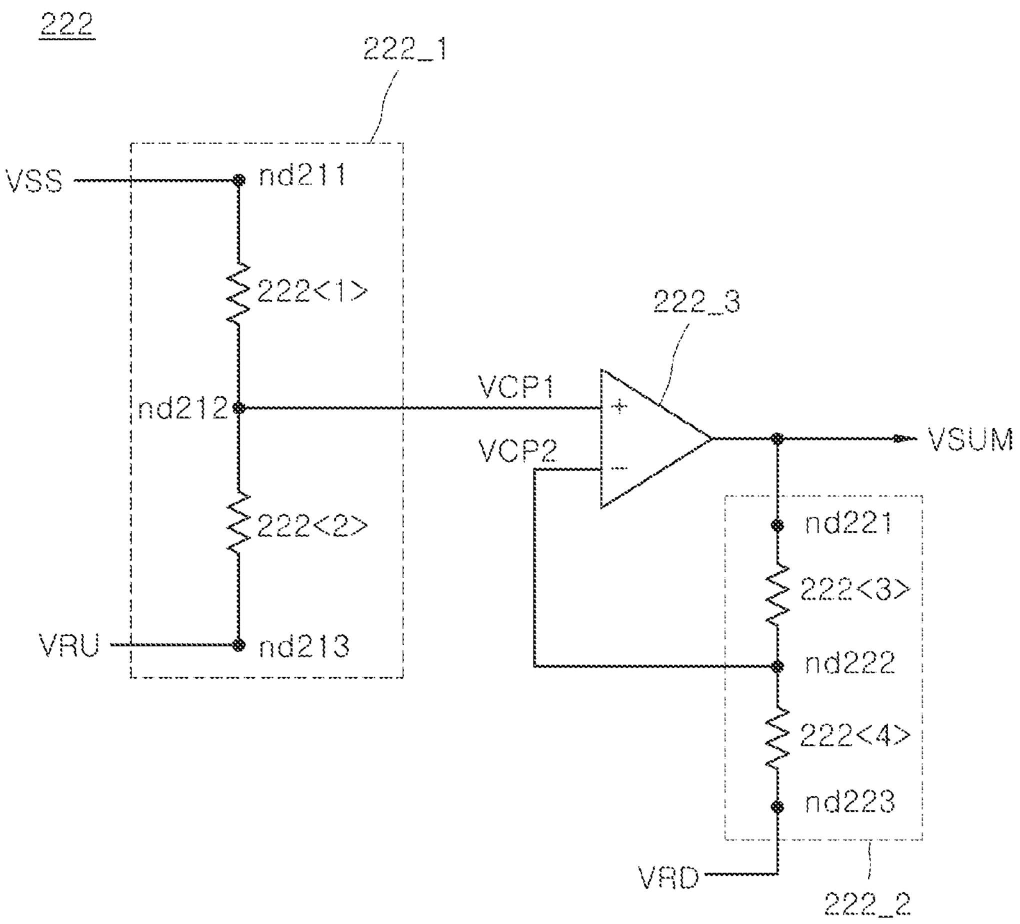
FIG. 13 is a diagram illustrating a construction according to an embodiment of a synthetic circuit that is included in the synthetic voltage generation circuit illustrated in FIG. 12.

FIG. 13 is a diagram illustrating a construction according to an embodiment of the synthetic circuit 222 that is included in the synthetic voltage generation circuit 22. The synthetic circuit 222 may include a first voltage division circuit 222_1, a second voltage division circuit 2222, and a first comparator 222_3.

The first voltage division circuit 222_1 may be implemented with a resistor 222<1> that is disposed between a node nd211 to which the ground voltage VSS is supplied and a node nd212 and a resistor 222<2> that is disposed between the node nd212 and a node nd213 to which the upper limit reference voltage VRU is supplied.

The first voltage division circuit 2221 may generate the first comparison voltage VCP1 having an intermediate voltage level, the voltage level being between the voltage levels of the ground voltage VSS and the upper limit reference voltage VRU, through the resistors 222<1> and 222<2> that are disposed between the ground voltage VSS and the upper limit reference voltage VRU. The resistors 222<1> and 222<2> may be set to have the same resistance value.

The second voltage division circuit 222_2 may be implemented with a resistor 222<3> that is disposed between a node nd221 to which the synthetic voltage VSUM is supplied and a node nd222 and a resistor 222<4> that is disposed between the node nd222 and a node nd223 to which the lower limit reference voltage VRD is supplied.

The second voltage division circuit 2222 may generate the second comparison voltage VCP2 having an intermediate voltage level, the voltage level being between the voltage levels of the synthetic voltage VSUM and the lower limit reference voltage VRD, through the resistors 222<3> and 222<4> that are disposed between the synthetic voltage VSUM and the lower limit reference voltage VRD. The resistors 222<3> and 222<3> may be set to have the same resistance value.

The first comparator 222_3 may generate the synthetic voltage VSUM by comparing the first comparison voltage VCP1 with the second comparison voltage VCP2. The first comparator 222_3 may set the voltage level of the synthetic voltage VSUM by comparing the first comparison voltage VCP1 with the second comparison voltage VCP2. The first comparator 222_3 may raise the voltage level of the synthetic voltage VSUM when the voltage level of the second comparison voltage VCP2 is lower than the first comparison voltage VCP1.

Figure 14:
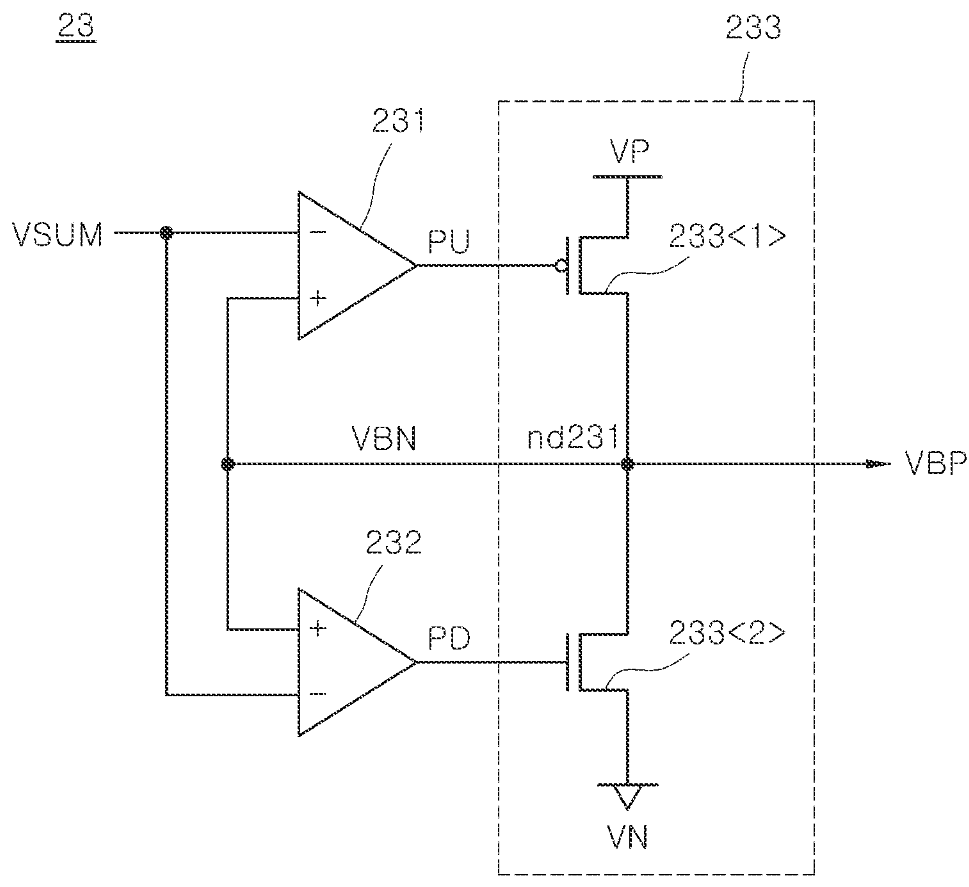
FIG. 14 is a diagram illustrating a construction according to an embodiment of an internal voltage generation circuit that is included in the electronic device illustrated in FIG. 11.

FIG. 14 is a diagram illustrating a construction according to an embodiment of the internal voltage generation circuit 23 that is included in the electronic device 2. The internal voltage generation circuit 23 may include a second comparator 231, a third comparator 232, and an internal voltage driving circuit 233.

The second comparator 231 may generate a pull-up signal PU by comparing the synthetic voltage VSUM with the internal voltage VBN. The second comparator 231 may generate the pull-up signal PU that is enabled to a logic low level when the voltage level of the synthetic voltage VSUM is lower than the voltage level of the internal voltage VBN.

The third comparator 232 may generate a pull-down signal PD by comparing the synthetic voltage VSUM with the internal voltage VBN. The third comparator 232 may generate the pull-down signal PD that is enabled to a logic high level when the voltage level of the internal voltage VBN is higher than the voltage level of the synthetic voltage VSUM.

The internal voltage driving circuit 233 may be implemented with a PMOS transistor 233<1> that is disposed between a positive voltage VP and a node nd231 and that is turned on by the pull-up signal PU and an NMOS transistor 233<2> that is disposed between the node nd231 and a negative voltage VN and that is turned on by the pull-down signal PD. The positive voltage VP may be set as a voltage having a higher voltage level than the ground voltage VSS. The negative voltage VN may be set as a voltage having a lower voltage level than the ground voltage VSS. The positive voltage VP and the negative voltage VN may be set as various voltages that are used in the electronic device 2.

The internal voltage driving circuit 233 may drive the internal voltage VBN to the voltage level of the positive voltage VP when the pull-up signal PU is enabled to a logic low level. The internal voltage driving circuit 233 may drive the internal voltage VBN to the voltage level of the negative voltage VN when the pull-down signal PD is enabled to a logic high level.

Such an electronic device 2 may generate the internal voltage VBN having a constant voltage level based on the synthetic voltage VSUM that is generated by synthesizing the ground voltage VSS and the upper limit reference voltage VRU having a constant voltage level regardless of a change in the voltage level of the first external voltage VDD1. By generating the synthetic voltage VSUM by compensating for a change in the voltage level of the first external voltage VDD1 and a PVT variation and using the synthetic voltage VSUM as the inputs of the comparators 231 and 232 for generating the internal voltage VBN, the electronic device 2 can prevent a phenomenon in which a transistor using the internal voltage VBN is latched up. By generating the synthetic voltage VSUM by compensating for a PVT variation and using the synthetic voltage VSUM as the inputs of the comparators 231 and 232 for generating the internal voltage VBN, the electronic device 2 can generate the internal voltage VBN the voltage level of which is matched with a target voltage level.

Figure 15:
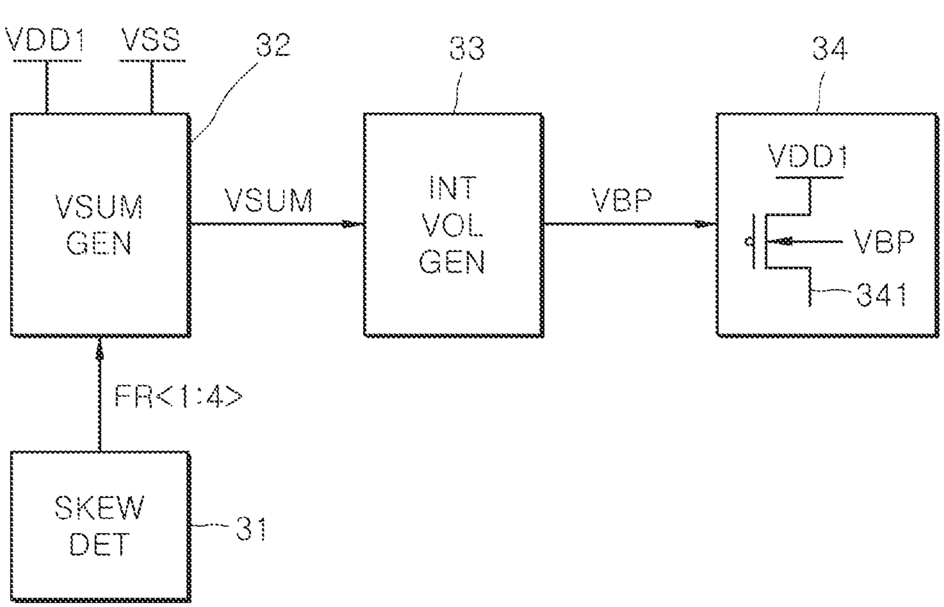
FIG. 15 is a block diagram illustrating a construction of an electronic device according to another embodiment of the present disclosure.

FIG. 15 is a block diagram illustrating a construction of an electronic device 3 according to another embodiment of the present disclosure. As illustrated in FIG. 15, the electronic device 3 according to another embodiment of the present disclosure may include a skew detection circuit (SKEW DET) 31, a synthetic voltage generation circuit (VSUM GEN) 32, an internal voltage generation circuit (INT VOL GEN) 33, and an internal circuit 34.

The skew detection circuit 31 may generate first to fourth process codes FR<1:4> by detecting a PVT variation. The skew detection circuit 31 may generate the first to fourth process codes FR<1:4> that are up-counted when the operating speed of the electronic device is slow in response to a PVT variation. The skew detection circuit 31 may generate the first to fourth process codes FR<1:4> that are down-counted when the operating speed of the electronic device is fast in response to a PVT variation. The PVT variation may mean process, voltage, and temperature variations within the electronic device 3.

The synthetic voltage generation circuit 32 may generate a synthetic voltage VSUM from a first external voltage VDD1 and a ground voltage VSS by compensating for a change in the voltage level of the first external voltage VDD1 and a PVT variation. The synthetic voltage generation circuit 32 may generate the synthetic voltage VSUM based on the first external voltage VDD1, the ground voltage VSS, and the first to fourth process codes FR<1:4>. The synthetic voltage generation circuit 32 may generate first to fourth voltage codes (VC<1:4> in FIG. 17) in response to a change in the voltage level of the first external voltage VDD1. The synthetic voltage generation circuit 32 may generate the synthetic voltage VSUM, the voltage level of which is set based on the first to fourth voltage codes (VC<1:4> in FIG. 17) and the first to fourth process codes FR<1:4>. The first to fourth process codes FR<1:4> and the first to fourth voltage codes (VC<1:4> in FIG. 17) may each be implemented as four bits but may be implemented to include various bits according to an embodiment. The first external voltage VDD1 may be set as a voltage that is supplied from outside of the electronic device 3.

The internal voltage generation circuit 33 may generate an internal voltage VBP based on the synthetic voltage VSUM. Based on the synthetic voltage VSUM, the internal voltage generation circuit 33 may generate the internal voltage VBP that is used as a body voltage of a PMOS transistor 341 included in the internal circuit 34. The internal voltage VBP may be generated to have a positive voltage level as a body voltage of a common PMOS transistor. The internal voltage generation circuit 33 may be implemented with the same circuits as the internal voltage generation circuit 13, illustrated in FIG. 10, and may perform the same operation as the internal voltage generation circuit 13, and thus, detailed descriptions of the circuits and operation have been omitted.

The internal circuit 34 may be implemented as a common circuit including multiple transistors. The internal circuit 34 may include the PMOS transistor 341. The PMOS transistor 341 may be used in the internal circuit 34 that performs various operations by receiving the internal voltage VBP as its body voltage. The PMOS transistor 341 may perform an operation that supplies charges by receiving the first external voltage VDD1. The first external voltage VDD1 that is supplied to the internal circuit 34 may be set as various voltages, such as a core voltage VCORE that is used in the electronic device 3.

The electronic device 3 may generate the internal voltage VBP having a constant voltage level based on the synthetic voltage VSUM that is generated by synthesizing the first to fourth voltage codes (VC<1:4> in FIG. 17) that are generated in response to a change in the voltage level of the first external voltage VDD1 and the first to fourth process codes FR<1:4> that are generated regardless of a change in the voltage level of the first external voltage VDD1. By generating the synthetic voltage VSUM by compensating for a change in the voltage level of the first external voltage VDD1 and a PVT variation and using the synthetic voltage VSUM as the input of the comparator (131 in FIG. 10) for generating the internal voltage VBP, the electronic device 3 can prevent a phenomenon in which a transistor using the internal voltage VBP is latched up. By generating the synthetic voltage VSUM by compensating for a change in the voltage level of the first external voltage VDD1 and a PVT variation and using the synthetic voltage VSUM as the input of the comparator (131 in FIG. 10) for generating the internal voltage VBP, the electronic device 3 can generate the internal voltage VBP the voltage level of which is matched with a target voltage level.

Figure 16:
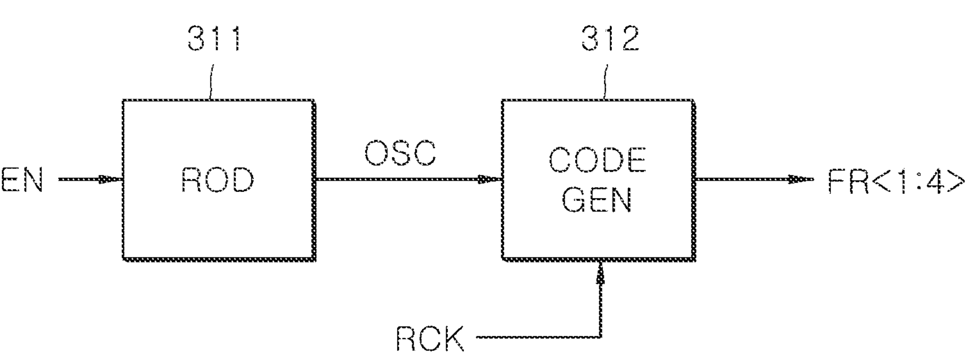
FIG. 16 is a block diagram illustrating a construction according to an embodiment of a skew detection circuit that is included in the electronic device illustrated in FIG. 15.

FIG. 16 is a block diagram illustrating a construction according to an embodiment of the skew detection circuit 31 that is included in the electronic device 3. The skew detection circuit 31 may include an oscillator (ROD) 311 and a code generation circuit (CODE GEN) 312.

The oscillator 311 may generate a period signal OSC that is periodically toggled in response to an enable signal EN. The oscillator 311 may generate the period signal OSC including a pulse that is periodically generated in response to the enable signal EN. The oscillator 311 may generate the period signal OSC that is periodically toggled during an interval in which the enable signal EN is enabled in order to detect a PVT variation. The oscillator 311 may generate the period signal OSC having varying timing at which the pulse is generated in response to a PVT variation. The enable signal EN may be set as a signal that is enabled to a logic high level in order to perform an operation that detects a PVT variation. The oscillator 311 may be implemented as the same circuits as the oscillator 111, illustrated in FIG. 3, and may perform the same operation as the oscillator 111, and thus, detailed descriptions of the circuits and operation have been omitted.

The code generation circuit 312 may generate the first to fourth process codes FR<1:4> by comparing the phase of the period signal OSC with the phase of a reference clock RCK. The code generation circuit 312 may generate the first to fourth process codes FR<1:4> that are up-counted when the phase of the period signal OSC is later than the phase of the reference clock RCK. The code generation circuit 312 may generate the first to fourth process codes FR<1:4> that are down-counted when the phase of the period signal OSC is earlier than the phase of the reference clock RCK.

Figure 17:
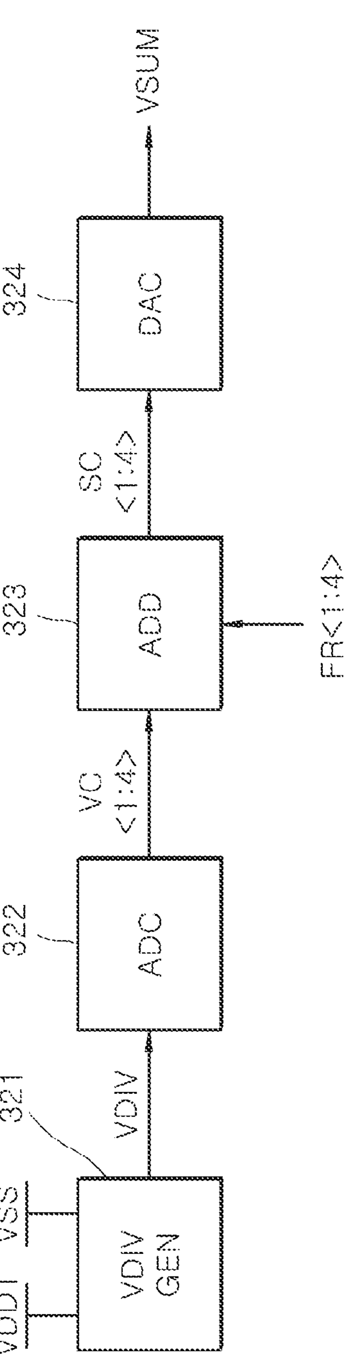
FIG. 17 is a block diagram illustrating a construction according to an embodiment of a synthetic voltage generation circuit that is included in the electronic device illustrated in FIG. 15.

FIG. 17 is a block diagram illustrating a construction according to an embodiment of the synthetic voltage generation circuit 32 that is included in the electronic device 3. The synthetic voltage generation circuit 32 may include a division voltage generation circuit (VDIV GEN) 321, a voltage code generation circuit (ADC) 322, a code synthesis circuit (ADD) 323, and a voltage generation circuit (DAC) 324.

The division voltage generation circuit 321 may generate a division voltage VDIV based on the first external voltage VDD1 and the ground voltage VSS. The division voltage generation circuit 321 may generate the division voltage VDIV having a voltage level that is half the voltage level of the first external voltage VDD1. The division voltage generation circuit 321 may generate the division voltage VDIV, the voltage level of which rises, when the voltage level of the first external voltage VDD1 rises. The division voltage generation circuit 321 may generate the division voltage VDIV, the voltage level of which drops, when the voltage level of the first external voltage VDD1 drops. The division voltage generation circuit 321 may be implemented with the same circuits as the first voltage division circuit 121_1, illustrated in FIG. 7, and may perform the same operation as the first voltage division circuit 121_1, and thus, detailed descriptions of the circuits and operation have been omitted.

The voltage code generation circuit 322 may generate the first to fourth voltage codes VC<1:4> based on the division voltage VDIV. The voltage code generation circuit 322 may generate the first to fourth voltage codes VC<1:4> by detecting the voltage level of the division voltage VDIV. The voltage code generation circuit 322 may generate the first to fourth voltage codes VC<1:4> having a logic level combination corresponding to the voltage level of the division voltage VDIV. The voltage code generation circuit 322 may generate the first to fourth voltage codes VC<1:4> that are up-counted when the voltage level of the division voltage VDIV rises. The voltage code generation circuit 322 may generate the first to fourth voltage codes VC<1:4> that are down-counted when the voltage level of the division voltage VDIV drops. The voltage code generation circuit 322 may be implemented as a common analog digital converter that generates a digital signal by detecting an analog voltage level.

The code synthesis circuit 323 may generate first to fourth synthetic codes SC<1:4> by synthesizing the first to fourth voltage codes VC<1:4> and the first to fourth process codes FR<1:4>. For example, when the voltage level of the division voltage VDIV is 600 mV, the first to fourth voltage codes VC<1:4> may be generated as "0110". When the first to fourth process codes FR<1:4> are generated as "0001" by detecting the time at which a PVT variation is changed into 100 mV, the code synthesis circuit 323 may generate the first to fourth synthetic codes SC<1:4> as "0111" by synthesizing the first to fourth voltage codes VC<1:4> of "0110" and the first to fourth process codes FR<1:4> of "0001".

The voltage generation circuit 324 may generate the synthetic voltage VSUM based on the first to fourth synthetic codes SC<1:4>. The voltage generation circuit 324 may generate the synthetic voltage VSUM having a voltage level corresponding to a logic level combination of the first to fourth synthetic codes SC<1:4>. For example, the voltage generation circuit 324 may generate the synthetic voltage VSUM having a voltage level of 700 mV when the first to fourth synthetic codes SC<1:4> are generated as "0111". The voltage generation circuit 324 may be implemented as a common digital analog converter that generates an analog voltage by detecting a digital signal.

Such an electronic device 3 may generate the synthetic voltage VSUM based on the plurality of synthetic codes SC<1:4> that are generated by synthesizing the plurality of voltage codes VC<1:4>, a logic level combination of which is changed in response to a change in the voltage level of the first external voltage VDD1, and the plurality of process codes FR<1:4> that is generated by detecting a PVT variation and may generate the internal voltage VBP having a constant voltage level based on the synthetic voltage VSUM. By generating the synthetic voltage VSUM by compensating for a change in the voltage level of the first external voltage VDD1 and a PVT variation and using the synthetic voltage VSUM as the input of the comparator (131 in FIG. 10) for generating the internal voltage VBP, the electronic device 3 can prevent a phenomenon in which a transistor using the internal voltage VBP is latched up. By generating the synthetic voltage VSUM by compensating for a change in the voltage level of the first external voltage VDD1 and a PVT variation and using the synthetic voltage VSUM as the input of the comparator (131 in FIG. 10) for generating the internal voltage VBP, the electronic device 3 can generate the internal voltage VBP the voltage level of which is matched with a target voltage level.

What is claimed is:

1. An electronic device comprising:

a synthetic voltage generation circuit configured to generate a synthetic voltage by synthesizing a supply voltage, a voltage level of which is changed in response to a change in a voltage level of a first external voltage, and an upper limit reference voltage, a voltage level of which is set in response to a first selection signal and a second selection signal that are generated by detecting a process, voltage, and temperature (PVT) variation in the electronic device; and an internal voltage generation circuit configured to, based on the synthetic voltage, generate an internal voltage that is used as a body voltage of a transistor included in an internal circuit.

2. The electronic device of claim 1, wherein the synthetic voltage generation circuit generates the upper limit reference voltage having a constant voltage level regardless of the change in the voltage level of the first external voltage.

3. The electronic device of claim 1, wherein the synthetic voltage generation circuit generates the upper limit reference voltage having a high voltage level when an operating speed of the electronic device becomes slow in response to the PVT variation, and wherein the synthetic voltage generation circuit generates the upper limit reference voltage having a low voltage level when the operating speed of the electronic device becomes fast in response to the PVT variation.

4. The electronic device of claim 1, wherein the transistor is set as a PMOS transistor.

5. The electronic device of claim 1, wherein the synthetic voltage generation circuit comprises:

a supply voltage generation circuit configured to generate a supply voltage having a voltage level that is half the voltage level of the first external voltage;

a reference voltage generation circuit configured to generate the upper limit reference voltage and a lower limit reference voltage, the voltage levels of which are set in response to the first selection signal and the second selection signal; and a synthetic circuit configured to generate the synthetic voltage based on the supply voltage, the upper limit reference voltage, and the lower limit reference voltage.

6. The electronic device of claim 5 wherein the supply voltage generation circuit comprises:

a first voltage division circuit configured to generate a division voltage that is divided from the first external voltage; and a first comparator configured to set the voltage level of the supply voltage by comparing the division voltage with the supply voltage.

7. The electronic device of claim 5 wherein the reference voltage generation circuit comprises:

a fixed voltage generation circuit configured to generate a fixed voltage having a constant voltage level regardless of the voltage level of the first external voltage;

a second voltage division circuit configured to generate a first internal reference voltage, a second internal reference voltage, and a third internal reference voltage that sequentially have lower voltage levels by dividing the fixed voltage; and a selection transfer circuit configured to output one of the first internal reference voltage and the second internal reference voltage as the upper limit reference voltage in response to the first selection signal and the second selection signal and configured to output the third internal reference voltage as the lower limit reference voltage.

8. The electronic device of claim 5 wherein the synthetic circuit comprises:

a third voltage division circuit configured to generate a first comparison voltage having an intermediate voltage level between the voltage level of the supply voltage and the voltage level of the upper limit reference voltage;

a fourth voltage division circuit configured to generate a second comparison voltage having an intermediate voltage level between a voltage level of the synthetic voltage and the voltage level of the lower limit reference voltage; and a second comparator configured to set a voltage level of the synthetic voltage by comparing the first comparison voltage with the second comparison voltage.

9. The electronic device of claim 1, wherein the internal voltage generation circuit comprises:

a third comparator configured to generate a pull-up signal by comparing the synthetic voltage with a feedback voltage that is generated by dividing the internal voltage; and an internal voltage driving circuit configured to generate the feedback voltage by dividing the internal voltage and configured to drive the internal voltage to a voltage level of a second external voltage when the pull-up signal is enabled.

10. The electronic device of claim 1, further comprising a skew detection circuit configured to generate the first selection signal and the second selection signal by detecting the PVT variation.

11. The electronic device of claim 10, wherein the skew detection circuit comprises:

an oscillator configured to generate a period signal that is periodically toggled during an interval in which an enable signal is enabled in order to detect the PVT variation; and a comparison circuit configured to generate the first selection signal and the second selection signal by comparing a phase of the period signal, which is changed in response to the PVT variation, with a phase of a reference clock.

12. The electronic device of claim 10, wherein the skew detection circuit comprises:

a monitoring circuit configured to generate first process information, second process information, and third process information comprising feature information regarding the transistor that is included in the internal circuit during an interval in which an enable signal is enabled to detect the PVT variation; and a selection signal generation circuit configured to generate the first selection signal and the second selection signal based on the first process information, the second process information, and the third process information.

13. An electronic device comprising:

a skew detection circuit configured to generate a first selection signal and a second selection signal by detecting a process, voltage, and temperature (PVT) variation in the electronic device;

a synthetic voltage generation circuit configured to generate a synthetic voltage by synthesizing a ground voltage and an upper limit reference voltage, a voltage level of which is set in response to the first selection signal and the second selection signal; and an internal voltage generation circuit configured to, based on the synthetic voltage, generate an internal voltage that is used as a body voltage of a transistor included in an internal circuit.

14. The electronic device of claim 13, wherein the synthetic voltage generation circuit generates the upper limit reference voltage having a constant voltage level regardless of a change in a voltage level of an external voltage.

15. The electronic device of claim 13, wherein the synthetic voltage generation circuit generates the upper limit reference voltage having a low voltage level, when the first selection signal that is enabled when an operating speed of the electronic device becomes slow in response to the PVT variation is enabled, and wherein the synthetic voltage generation circuit generates the upper limit reference voltage having a high voltage level when the second selection signal that is enabled when the operating speed of the electronic device becomes fast in response to the PVT variation is enabled.

16. The electronic device of claim 13, wherein the transistor is set as an NMOS transistor.

17. The electronic device of claim 13, wherein the synthetic voltage generation circuit comprises:

a reference voltage generation circuit configured to generate the upper limit reference voltage and a lower limit reference voltage, the voltage levels of which are set in response to the first selection signal and the second selection signal; and a synthetic circuit configured to generate a synthetic voltage based on the ground voltage, the upper limit reference voltage, and the lower limit reference voltage.

18. The electronic device of claim 17, wherein the reference voltage generation circuit comprises:

a fixed voltage generation circuit configured to generate a fixed voltage having a constant voltage level regardless of a voltage level of an external voltage;

a first voltage division circuit configured to generate a first internal reference voltage, a second internal reference voltage, and a third internal reference voltage that sequentially have lower voltage levels by dividing the fixed voltage; and a selection transfer circuit configured to output one of the first internal reference voltage and the second internal reference voltage as the upper limit reference voltage in response to the first selection signal and the second selection signal and configured to output the third internal reference voltage as the lower limit reference voltage.

19. The electronic device of claim 17, wherein the synthetic circuit comprises:

a second voltage division circuit configured to generate a first comparison voltage having an intermediate voltage level between a voltage level of the ground voltage and the voltage level of the upper limit reference voltage;

a third voltage division circuit configured to generate a second comparison voltage having an intermediate voltage level between a voltage level of the synthetic voltage and the voltage level of the lower limit reference voltage; and a first comparator configured to set the voltage level of the synthetic voltage by comparing the first comparison voltage with the second comparison voltage.

20. The electronic device of claim 13, wherein the internal voltage generation circuit comprises:

a second comparator configured to generate a pull-up signal by comparing voltage levels of the synthetic voltage and the internal voltage;

a third comparator configured to generate a pull-down signal by comparing the voltage levels of the synthetic voltage and the internal voltage; and an internal voltage driving circuit configured to drive the internal voltage to a voltage level of a positive voltage when the pull-up signal is enabled and configured to drive the internal voltage to a voltage level of a negative voltage when the pull-down signal is enabled.

21. An electronic device comprising:

a skew detection circuit configured to generate a plurality of process codes by detecting a process, voltage, and temperature (PVT) variation in the electronic device;

a synthetic voltage generation circuit configured to generate a plurality of voltage codes by detecting a change in a voltage level of a first external voltage and configured to generate a synthetic voltage, a voltage level of which is set based on the plurality of voltage codes and the plurality of process codes; and an internal voltage generation circuit configured to, based on the synthetic voltage, generate an internal voltage that is used as a body voltage of a transistor included in an internal circuit.

22. The electronic device of claim 21, wherein the synthetic voltage generation circuit adjusts the voltage level of the synthetic voltage based on a logic level combination of a plurality of synthetic codes that are generated by synthesizing the plurality of voltage codes and the plurality of process codes.

23. The electronic device of claim 21, wherein the skew detection circuit comprises:

an oscillator configured to generate a period signal that is periodically toggled during an interval in which an enable signal is enabled in order to detect the PVT variation; and a code generation circuit configured to generate the plurality of process codes by comparing a phase of the period signal, which is changed in response to the PVT variation, and a phase of a reference clock.

24. The electronic device of claim 23, wherein the code generation circuit up-counts the plurality of process codes when the phase of the period signal is later than the phase of the reference clock, and wherein the code generation circuit down-counts the plurality of process codes when the phase of the period signal is earlier than the phase of the reference clock.

25. The electronic device of claim 21, wherein the transistor is set as a PMOS transistor.

26. The electronic device of claim 21, wherein the synthetic voltage generation circuit comprises:

a division voltage generation circuit configured to generate a division voltage having a voltage level that is half the voltage level of the first external voltage;

a voltage code generation circuit configured to generate the plurality of voltage codes by detecting a voltage level of the division voltage;

a code synthesis circuit configured to generate a plurality of synthetic codes that are generated by synthesizing the plurality of voltage codes and the plurality of process codes; and a voltage generation circuit configured to generate the synthetic voltage, the voltage level of which is set based on logic levels of the plurality of synthetic codes.

27. The electronic device of claim 26, wherein the voltage code generation circuit comprises an analog digital converter configured to generate the plurality of voltage codes having a logic level combination corresponding to the voltage level of the division voltage.

28. The electronic device of claim 26, wherein the voltage generation circuit comprises a digital analog converter configured to generate the synthetic voltage having a voltage level corresponding to a logic level combination of the plurality of synthetic codes.

29. The electronic device of claim 21, wherein the internal voltage generation circuit comprises:

a comparator configured to generate a pull-up signal by comparing the synthetic voltage with a feedback voltage that is generated by dividing the internal voltage; and a internal voltage driving circuit configured to generate the feedback voltage by dividing the internal voltage and configured to drive the internal voltage to a voltage level of a second external voltage when the pull-up signal is enabled.

* * * * *